United States Patent
Webb et al.

(10) Patent No.: US 11,473,470 B2
(45) Date of Patent: *Oct. 18, 2022

(54) METHODS FOR OPERATION OF AN EMISSIONS AFTERTREATMENT SYSTEM FOR NOX CONTROL DURING REGENERATION OF DIESEL PARTICULATE FILTER

(71) Applicant: PACCAR Inc, Bellevue, WA (US)

(72) Inventors: Cynthia Chaffin Webb, Sedro-Woolley, WA (US); Charles Wayne Reinhardt Swart, Bellingham, WA (US); Maarten Meijer, Anacortes, WA (US); Varun Ramesh, Bellingham, WA (US)

(73) Assignee: PACCAR INC, Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/507,560

(22) Filed: Oct. 21, 2021

(65) Prior Publication Data

US 2022/0042439 A1 Feb. 10, 2022

Related U.S. Application Data

(63) Continuation of application No. 17/002,505, filed on Aug. 25, 2020, now Pat. No. 11,181,026.

(60) Provisional application No. 63/057,053, filed on Jul. 27, 2020, provisional application No. 63/056,131, filed on Jul. 24, 2020, provisional application No. 63/054,468, filed on Jul. 21, 2020.

(51) Int. Cl.
*F01N 3/00* (2006.01)
*F01N 3/20* (2006.01)
*F01N 3/035* (2006.01)
*F01N 3/029* (2006.01)

(52) U.S. Cl.
CPC .......... *F01N 3/2066* (2013.01); *F01N 3/0293* (2013.01); *F01N 3/035* (2013.01); *F01N 3/2006* (2013.01); *F01N 2250/02* (2013.01); *F01N 2260/04* (2013.01); *F01N 2570/14* (2013.01); *F01N 2610/03* (2013.01); *F01N 2610/1453* (2013.01)

(58) Field of Classification Search
CPC ..... F01N 3/2066; F01N 3/035; F01N 2260/04
See application file for complete search history.

(56) References Cited

U.S. PATENT DOCUMENTS

| | | |
|---|---|---|
| 8,778,290 B1 | 7/2014 | Ren et al. |
| 10,690,033 B1 | 6/2020 | Johnson et al. |
| 10,753,255 B2 | 8/2020 | Schweizer |
| 10,760,513 B1 | 9/2020 | Huhn et al. |

(Continued)

FOREIGN PATENT DOCUMENTS

| | | |
|---|---|---|
| CN | 106246301 B | 7/2019 |
| DE | 10 2010 034707 A1 | 2/2012 |

(Continued)

*Primary Examiner* — Jason D Shanske
(74) *Attorney, Agent, or Firm* — Seed IP Law Group LLP (57) ABSTRACT

The present disclosure describes methods for operating an EAS including a close coupled SCR unit, a downstream SCR unit, a diesel oxidation catalyst unit (DOC) and a diesel particulate filter (DPF). The methods utilize the close coupled SCR unit to manage NOx emissions from the EAS during regeneration of a diesel particulate filter (DPF).

19 Claims, 5 Drawing Sheets

(56) References Cited

U.S. PATENT DOCUMENTS

| | | | |
|---|---|---|---|
| 10,920,641 | B2 | 2/2021 | Kinnaird et al. |
| 11,035,274 | B2 | 6/2021 | Johansson et al. |
| 11,181,026 | B1* | 11/2021 | Webb .................... F01N 3/021 |
| 2004/0128983 | A1 | 7/2004 | Okada et al. |
| 2006/0153761 | A1 | 7/2006 | Bandl-Konrad et al. |
| 2007/0079605 | A1 | 4/2007 | Hu et al. |
| 2007/0082783 | A1 | 4/2007 | Hu et al. |
| 2007/0122317 | A1 | 5/2007 | Driscoll et al. |
| 2007/0193253 | A1 | 8/2007 | Tsumagari |
| 2008/0072575 | A1 | 3/2008 | Yan |
| 2009/0035194 | A1 | 2/2009 | Robel et al. |
| 2009/0158706 | A1 | 6/2009 | Sun |
| 2009/0183501 | A1 | 7/2009 | Gonze et al. |
| 2010/0242440 | A1* | 9/2010 | Garimella .......... B01D 53/9409 702/182 |
| 2011/0000194 | A1 | 1/2011 | Gonze et al. |
| 2011/0047964 | A1 | 3/2011 | Yezerets et al. |
| 2011/0061372 | A1 | 3/2011 | Levijoki et al. |
| 2011/0265452 | A1 | 11/2011 | Geveci et al. |
| 2011/0271660 | A1 | 11/2011 | Gonze et al. |
| 2012/0085082 | A1 | 4/2012 | Levijoki et al. |
| 2013/0232958 | A1 | 9/2013 | Ancimer et al. |
| 2013/0311065 | A1 | 11/2013 | Sun et al. |
| 2014/0033683 | A1 | 2/2014 | Wei et al. |
| 2014/0363358 | A1 | 12/2014 | Udd et al. |
| 2015/0040540 | A1 | 2/2015 | Hulser et al. |
| 2015/0040543 | A1 | 2/2015 | Shetney et al. |
| 2015/0096287 | A1 | 4/2015 | Qi |
| 2015/0275730 | A1 | 10/2015 | Gupta et al. |
| 2015/0276694 | A1 | 10/2015 | Lahr |
| 2015/0314239 | A1 | 11/2015 | Kawaguchi et al. |
| 2015/0337702 | A1 | 11/2015 | Ettireddy et al. |
| 2016/0032803 | A1 | 2/2016 | Ettireddy et al. |
| 2016/0186629 | A1 | 6/2016 | Osbum et al. |
| 2016/0186630 | A1 | 6/2016 | Osbum et al. |
| 2017/0051654 | A1 | 2/2017 | Gupta et al. |
| 2017/0122159 | A1 | 5/2017 | Bahrami |
| 2017/0130629 | A1 | 5/2017 | Nagel et al. |
| 2017/0175604 | A1 | 6/2017 | Devarakonda et al. |
| 2017/0234199 | A1 | 8/2017 | Sun et al. |
| 2018/0080359 | A1 | 3/2018 | Price et al. |
| 2018/0087426 | A1 | 3/2018 | Dou et al. |
| 2018/0163589 | A1 | 6/2018 | David et al. |
| 2018/0230879 | A1 | 8/2018 | Saitoh et al. |
| 2018/0252136 | A1 | 9/2018 | Concetto Pesce et al. |
| 2018/0274420 | A1 | 9/2018 | Kleinknecht et al. |
| 2018/0274421 | A1 | 9/2018 | Smith et al. |
| 2018/0334939 | A1 | 11/2018 | Mital et al. |
| 2018/0345217 | A1 | 12/2018 | Goffe |
| 2018/0345218 | A1 | 12/2018 | Goffe |
| 2019/0078481 | A1* | 3/2019 | Schweizer ................ F01N 9/00 |
| 2019/0155230 | A1 | 5/2019 | Culbertson et al. |
| 2019/0345861 | A1* | 11/2019 | Johansson ............ F01N 3/2066 |
| 2019/0360415 | A1 | 11/2019 | Romanato |
| 2019/0383189 | A1 | 12/2019 | Dou et al. |
| 2020/0063634 | A1 | 2/2020 | Smith et al. |
| 2020/0316571 | A1 | 10/2020 | Goffe |
| 2020/0332691 | A1 | 10/2020 | Soeger et al. |
| 2021/0079826 | A1 | 3/2021 | Voss et al. |
| 2021/0095590 | A1 | 4/2021 | Bastoreala et al. |
| 2022/0010713 | A1 | 1/2022 | McCarthy, Jr. et al. |

FOREIGN PATENT DOCUMENTS

| | | |
|---|---|---|
| DE | 10 2018 205132 A1 | 10/2019 |
| EP | 3009622 A1 | 4/2016 |
| EP | 3581773 A1 | 12/2019 |
| WO | WO 2009031030 A2 | 3/2009 |
| WO | WO 2009123633 A2 | 10/2009 |
| WO | WO 2014032686 A1 | 3/2014 |

\* cited by examiner

SCR conversion efficiency as a function of SCR temperature

METHODS FOR OPERATION OF AN EMISSIONS AFTERTREATMENT SYSTEM FOR NOX CONTROL DURING REGENERATION OF DIESEL PARTICULATE FILTER

BACKGROUND

Technical Field

The present disclosure generally relates to engine emissions management, and more particularly, to internal combustion engine NOx emissions management.

Description of the Related Art

Although auto-ignited diesel engines are known to be more economical to run than spark-ignited engines, diesel engines inherently face challenges in the area of emissions. For example, diesel engine exhaust contains incompletely burned fuel known as particulate matter, or "soot". In addition to particulate matter, internal combustion engines including diesel engines produce a number of combustion products including hydrocarbons ("HC"), carbon monoxide ("CO"), nitrogen oxides ("$NO_x$"), and sulfur oxides ("$SO_x$"). Engine exhaust aftertreatment systems (EAS) can be utilized to reduce or eliminate emissions of these and other combustion products.

EAS include close coupled and downstream SCR units that include catalysts which, in combination with a diesel emission fluid (DEF) promote the conversion of NOx, in exhaust gas from an internal combustion engine, to water and nitrogen gas. A typical EAS also includes a diesel particulate filter (DPF) to remove diesel particulates or soot from the exhaust gas. Over time, soot collects in the DPF. A portion of the collected soot undergoes passive oxidation at temperatures of the exhaust gas flowing through the DPF; however, periodically the DPF must undergo an active regeneration in order to remove soot that is not removed by the passive oxidation. Active regeneration involves elevating the temperature of the exhaust gas within the DFP to about 500° C. Such elevated temperatures can be achieved by oxidizing reductants, such as hydrocarbons, e.g., from the diesel fuel in the exhaust.

BRIEF SUMMARY

A method may be summarized as comprising, operating an emissions aftertreatment system (EAS) for an internal combustion engine including a close coupled selective catalytic reduction (SCR) unit and a downstream (or underbody) SCR unit in the following manner. Introducing a reductant into an exhaust gas from an internal combustion engine downstream of the close coupled SCR unit and upstream of the downstream SCR unit. Flowing the reductant in the exhaust gas into a diesel oxidation catalyst (DOC) unit and oxidizing the reductant in the DOC unit. Increasing the temperature of the exhaust gas in the DOC unit and flowing the exhaust gas from the DOC unit to a diesel particulate filter (DPF) unit. Oxidizing soot in the DPF and during the oxidizing soot, reducing the NOx content of the exhaust gas in the close coupled SCR unit.

A method may be summarized as comprising, regenerating a DPF of an EAS for an internal combustion engine including a close coupled selective catalytic reduction (SCR) unit and a downstream (or underbody) SCR unit in the following manner. Introducing a reductant into an exhaust gas from an internal combustion engine downstream of the close coupled SCR unit and upstream of the downstream SCR unit. Flowing the reductant in the exhaust gas into a diesel oxidation catalyst (DOC) unit and oxidizing the reductant in the DOC unit. Increasing the temperature of the exhaust gas in the DOC unit and flowing the exhaust gas from the DOC unit to a diesel particulate filter (DPF) unit. Oxidizing soot in the DPF and during the oxidizing soot, reducing the NOx content of the exhaust gas in the close coupled SCR unit.

An emissions aftertreatment system may be summarized as including a close coupled SCR unit, a diesel exhaust fluid doser upstream of the close coupled SCR unit and a diesel oxidation catalyst unit, diesel particulate filter and downstream SCR unit downstream of the close coupled SCR unit. A reductant doser is provided between the close coupled SCR unit and the DOC unit.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation", "an implementation", "one embodiment" and "an embodiment" means that a particular feature, structure or characteristic described in connection with the implementation or embodiment is included in at least one implementation or embodiment. Thus, the appearances of the phrases "in one implementation", "in an implementation", "one embodiment" and "an embodiment" in various places throughout this specification are not necessarily all referring to the same implementation or the same embodiment. Furthermore, the particular features, structures, or characteristics may be combined in any suitable manner in one or more implementations or embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations or embodiments.

Terms of geometric alignment may be used herein. Any components of the embodiments that are illustrated, described, or claimed herein as being aligned, arranged in the same direction, parallel, or having other similar geometric relationships with respect to one another have such relationships in the illustrated, described, or claimed embodiments. In alternative embodiments, however, such components can have any of the other similar geometric properties described herein indicating alignment with respect to one another. Any components of the embodiments that are illustrated, described, or claimed herein as being not aligned, arranged in different directions, not parallel, perpendicular, transverse, or having other similar geometric relationships with respect to one another, have such relationships in the illustrated, described, or claimed embodiments. In alternative embodiments, however, such components can have any of the other similar geometric properties described herein indicating non-alignment with respect to one another.

Various examples of suitable dimensions of components and other numerical values may be provided herein. In the illustrated, described, and claimed embodiments, such dimensions are accurate to within standard manufacturing tolerances unless stated otherwise. Such dimensions are examples, however, and can be modified to produce variations of the components and systems described herein. In various alternative embodiments, such dimensions and any other specific numerical values provided herein can be approximations wherein the actual numerical values can vary by up to 1, 2, 5, 10, 15 or more percent from the stated, approximate dimensions or other numerical values.

Figure 1A:
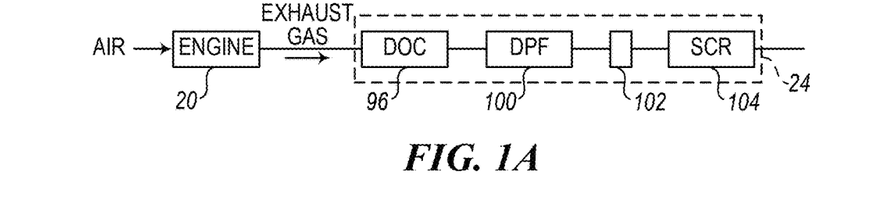
FIG. 1A is a schematic block diagram of an example of an emission aftertreatment system coupled to an internal combustion engine.

FIG. 1A shows a block diagram providing a brief overview of a vehicle powertrain. The components include an internal combustion engine 20 in flow communication with one or more selected components of an emission aftertreatment system 24 (EAS). The illustrated emission aftertreatment system 24 includes an oxidation system 96 upstream of a particulate filter 100. In the embodiment shown, the oxidation system 96 is a diesel oxidation catalyst (DOC) unit 96 coupled in flow communication to receive and treat exhaust from the engine 20. The DOC 96 is preferably a flow-through device that includes either a honeycomb-like or plate-like substrate. The DOC substrate has a surface area that includes (e.g., is coated with) a catalyst. The catalyst can be an oxidation catalyst, which can include a precious metal catalyst, such as platinum or palladium, for rapid exothermic conversion of hydrocarbons, carbon monoxide, and nitric oxides in the engine exhaust gas into carbon dioxide, nitrogen, water, or $NO_2$.

Once the exhaust flows through DOC 96 it flows into the particulate filter 100, which in the illustrated embodiment is a diesel particulate filter (DPF) 100. The DPF 100 is utilized to capture unwanted diesel particulate matter (e.g., soot) from the flow of exhaust gas exiting engine 20, by flowing exhaust across the walls of channels within DFP 100. The diesel particulate matter includes sub-micron sized solid and liquid particles found in exhaust of a diesel fueled internal combustion engine. The DPF 100 can be manufactured from a variety of materials including but not limited to cordierite, silicon carbide, and/or other high temperature oxide ceramics. In order to elevate the temperature of the exhaust gas to a level that will promote oxidation of soot built up in DPF 100 (e.g., an active regeneration of the DPF), a reductant, such as a hydrocarbon, e.g., from the diesel fuel is introduced into the exhaust gas upstream of the DOC. Such reductant will be oxidized in the DOC. Oxidation of the reductant will have the effect of increasing the temperature of the exhaust gas within the DOC. The exhaust gas which has been heated in the DOC flows to the DPF. During an active regeneration of the DPF, the temperature of the exhaust gas entering the DPF is greater than about 500° C., which is sufficient to oxidize soot within DPF that is not removed by passive regeneration.

From DPF 100, exhaust gases proceed through a compartment in fluid communication with a diesel exhaust fluid (DEF) doser 102. Operation of DEF doser introduces a reductant, such as ammonia or a urea solution, into the exhaust gases. The exhaust gases and reductant then flow to a selective catalytic reduction (SCR) system or unit 104 which includes a catalytic core having a selective catalytic reduction catalyst (SCR catalyst) loaded thereon. System 24 can include one or more sensors (not illustrated in FIG. 1A associated with components of the system 24, such as one or more temperature sensors, $NO_x$ sensors, $NH_3$ sensors, oxygen sensors, mass flow sensors, volumetric flow sensors, particulate sensors, and a pressure sensors.

As discussed above, the emission aftertreatment system 24 includes a Selective Catalytic Reduction (SCR) system 104. The SCR system 104 includes a selective catalytic reduction catalyst which interacts with $NO_x$ gases to convert the $NO_x$ gases into $N_2$ and water, in the presence of an ammonia reductant. The overall reactions of $NO_x$ reductions in SCR are shown below.

$$4NO+4NH_3+O_2 \rightarrow 4N_2+6H_2O \quad (1)$$

$$6NO_2+8NH_3 \rightarrow 7N_2+12H_2O \quad (2)$$

$$2NH_3+NO+NO_2 \rightarrow 2N_2+3H_2O \quad (3)$$

Where Equation (1) represents a standard SCR reaction and Equation (3) represents a fast SCR reaction.

Figure 2:
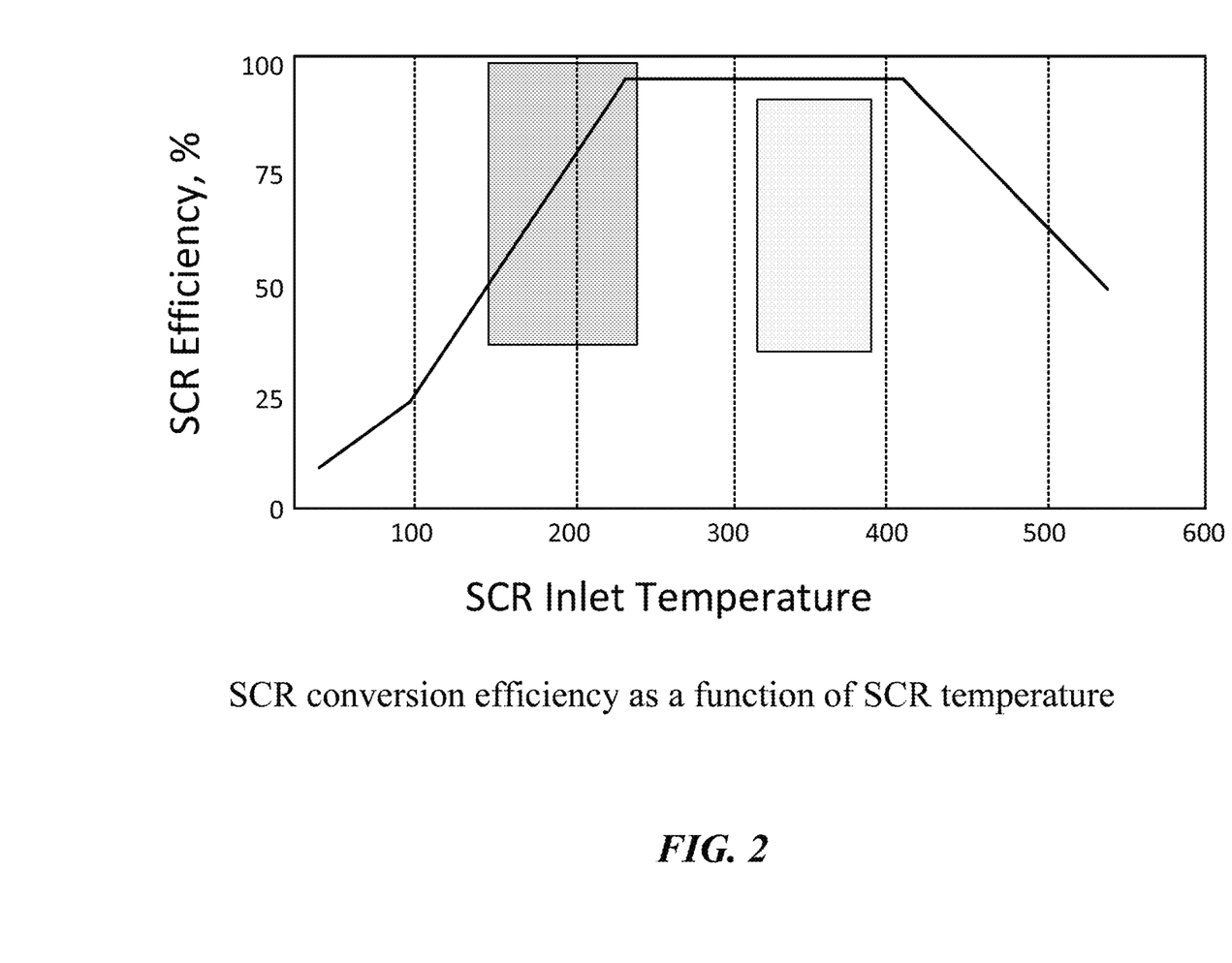
FIG. 2 is a graph of NOx conversion efficiency of an SCR unit as a function of temperature of exhaust gas at the inlet of the SCR unit.

As a consequence of the typical configuration of an EAS with a primary SCR unit 104 downstream of the DOC 96 and DPF 100, the SCR unit 104 downstream of the DOC 96 and DPF 100 cannot avoid exposure to the high temperature exhaust gas which passes through the DPF 100 during an active regeneration of DPF 100. Referring to FIG. 2, when the temperature of exhaust gas entering SCR unit 104 is above about 400° C., e.g., such as experienced during active regeneration of DPF 100, the NOx conversion efficiency of SCR unit 104 downstream of the DPF 100 declines. When the SCR unit 104 is exposed to exhaust gases that have been heated to about 500° C. in DOC 96, FIG. 2 shows that the NOx conversion efficiency of SCR unit 104 is well below the NOx conversion efficiency of the SCR unit when the temperature of the exhaust gas entering SCR unit 104 is between about 200° and 400° C., e.g., less than 75%. Such reduced NOx conversion efficiency in SCR unit 104 can result in NOx emissions from the EAS that are outside prescribed limits or cause the EAS system to fall out of compliance with prescribed regulations.

Figure 1B:
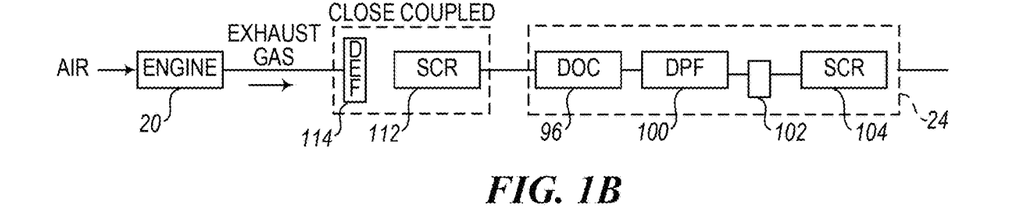
FIG. 1B is a schematic block diagram of an example of an emission aftertreatment system with a close coupled selective catalytic reduction unit coupled to an internal combustion engine.

Referring to FIG. 1B, some EAS include a "close-coupled SCR" or "upstream SCR" 112 associated with a DEF doser 114 that is located upstream of the close-coupled SCR 112. The close-coupled SCR 112 is located closer to the engine 20 than the downstream SCR 104 (sometimes referred to as an under-body SCR or downstream SCR unit) and in some embodiments as close to the engine as possible. An example of a close-coupled SCR configuration is illustrated in FIG. 1B. Such close-coupled SCR configuration employs DEF doser 102 and DEF doser 114 (one upstream of the close-coupled SCR 112 and one upstream of the downstream SCR 104 and downstream of the close-coupled SCR 112.

Figure 1C:
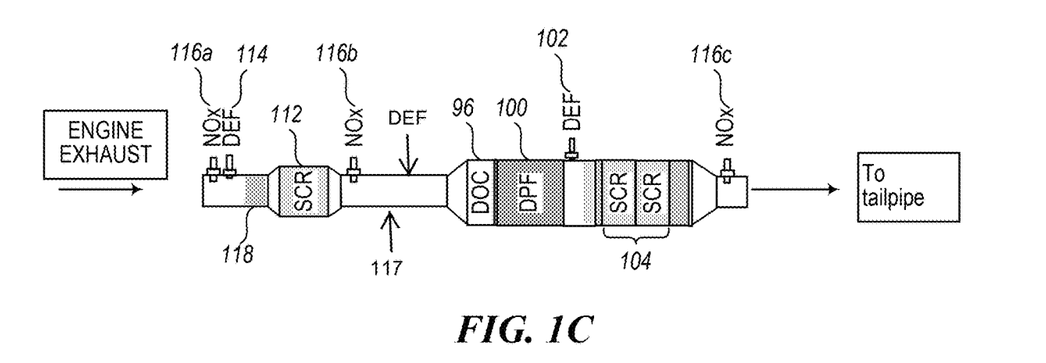
FIG. 1C is a schematic diagram of an example of an emission aftertreatment system with a close coupled selective catalytic reduction unit coupled to an internal combustion engine including a plurality of sensors, according to one non-limiting illustrated embodiment.

FIG. 1C illustrates an example of the EAS described above with reference to FIG. 1B with the addition of additional features. In FIG. 1C, features that are identical to features illustrated in FIG. 1B are identified by the same reference numbers as used in FIG. 1B. For example, EAS illustrated in FIG. 1C includes first DEF doser 114, upstream SCR unit 112, a reductant source 117 downstream of the upstream SCR unit 112, diesel oxidation catalyst unit 96, diesel particulate filter 100, second DEF doser 102 and downstream SCR unit 104. In alternative embodiments, second DEF doser 102 is provided between the close coupled, upstream SCR unit 112 and the DPF 100 or between the close coupled, upstream SCR unit 112 and the DOC 96. In the embodiment illustrated in FIG. 1C, downstream SCR 104 is illustrated as included two bricks of substrates supporting SCR catalyst(s). Reductant source 117 introduces a reductant, such as a hydrocarbon, into the exhaust gas between the close coupled SCR unit 112 and the DOC 96. Such reductant is available to be oxidized by the catalyst in the DOC 96. Oxidation of the reductant will have the effect of increasing the temperature of the exhaust gas within the DOC 96. The exhaust gas which has had its temperature elevated in the DOC 96 flows to the DPF 100. When the temperature of the exhaust gas entering the DPF 100 is greater than about 500° C., soot within DPF 100 is oxidized and active regeneration of the DPF is accomplished.

EAS illustrated in FIG. 1C further includes a plurality of NOx sensors 116. A NOx sensor 116a is located upstream of DEF doser 114. NOx sensor 116b is located downstream of upstream SCR 112 and upstream of DOC 96. NOx sensor 116c is positioned downstream of downstream SCR 104. Such NOx sensors are designed to detect concentrations of NOx in the exhaust gas; however, such NOx sensors used in EAS are often unable to differentiate between NOx in the exhaust gas and ammonia in the exhaust gas. Accordingly, signals generated by the NOx sensors are an indication of the concentration or amount of the combination of NOx and ammonia in the exhaust gas the sensor is interrogating. In the embodiment illustrated in FIG. 1C, the EAS includes a thermal input device 118, e.g., an electric heater downstream of DEF doser 114 and upstream of SCR unit 112. This thermal input device 118 is used to introduce thermal energy into the exhaust gas, thereby increasing the temperature of the exhaust gas flowing into the close coupled SCR unit 112. The temperature of the exhaust gas flowing into the close coupled SCR unit 112 can also be adjusted through the implementation of an exhaust gas recirculation system which recirculates a portion of the exhaust gas to the internal combustion engine. Adjusting the temperature of the exhaust gas flow into the close coupled SCR unit 112 is one way to adjust the temperature of the catalyst in the SCR unit 112. While the embodiment of an EAS illustrated in FIG. 1C includes two SCR units 112 and 104, embodiments of the present disclosure include an EAS that includes more than two SCR units and methods in accordance with embodiments of the present disclosure can be practiced in an EAS that includes two or more SCR units.

In accordance with an embodiment of the present disclosure, a DPF of an EAS, including a close coupled SCR unit and a downstream SCR unit, is actively regenerated while maintaining the NOx emissions from the EAS within prescribed limits. In accordance with some embodiments described herein, reductant, which will be oxidized in the DOC, is introduced into the exhaust gas downstream of the close coupled SCR unit as part of an active regeneration of the DPF. This reductant is oxidized in the DOC thereby raising the temperature of the exhaust gas to levels that promote oxidation of soot in the DPF, but also to levels where the NOx conversion efficiency of the downstream SCR unit decreases significantly. In accordance with embodiments of the present disclosure, during the active regeneration of the DPF, DEF is dosed to the exhaust gas upstream of the close coupled SCR unit and the close coupled SCR unit operates as a primary device to reduce the NOx content of the exhaust gas. During the active regeneration of the DPF, in accordance with embodiments of the present disclosure, 50% or more, 60% or more, 70% or more, 80% or more, or 90% or more of the overall NOx reduction provided by the EAS is provided by the close coupled SCR unit. Overall NOx reduction by the EAS refers to the difference between NOx content of the exhaust gas entering the close coupled SCR unit and the NOx content of the exhaust gas exiting the downstream SCR unit.

Figure 3:
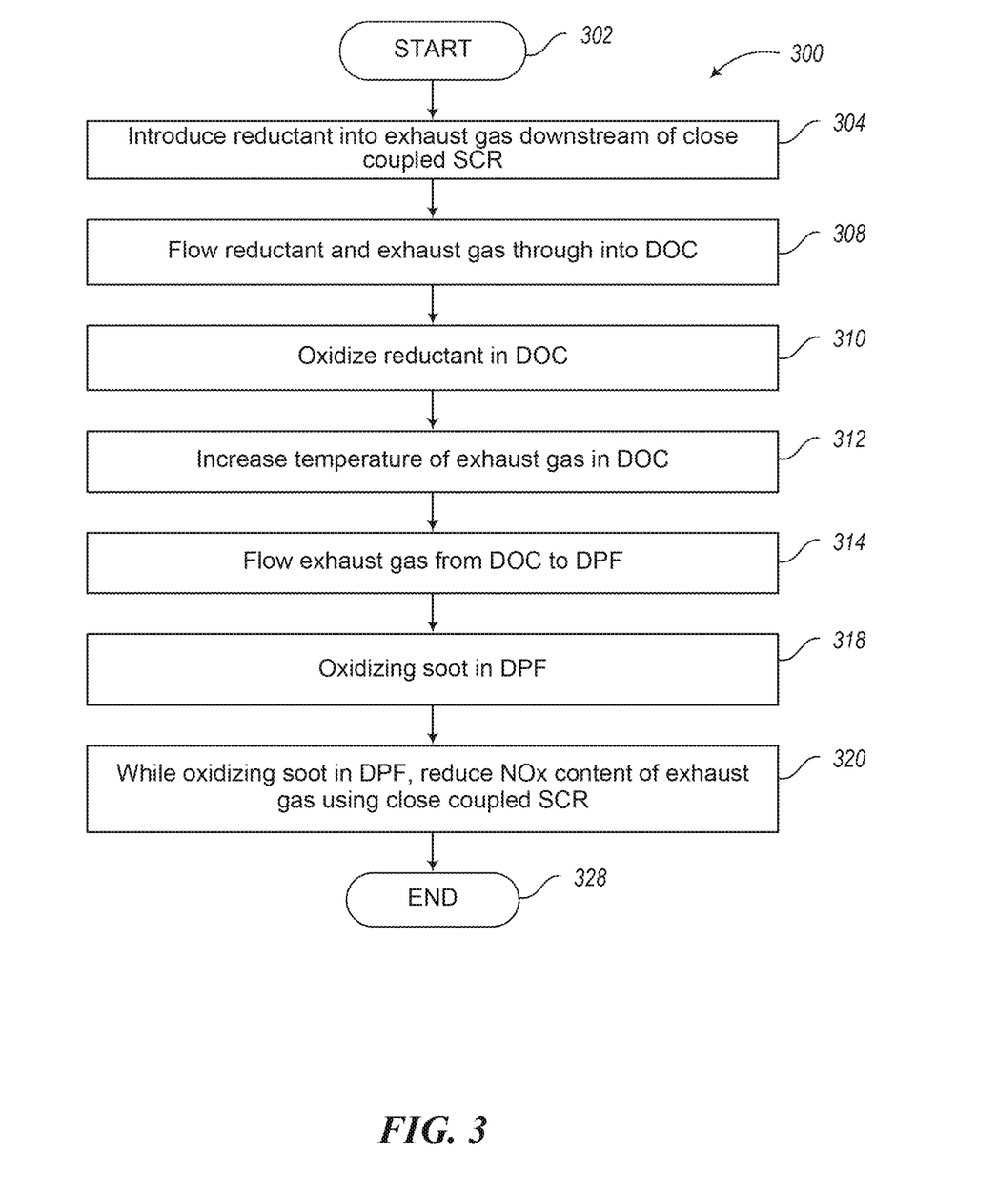
FIG. 3 is a flow diagram of a method of operating an emissions aftertreatment system according to one non-limiting illustrated embodiment.

Referring to FIG. 3, in accordance with an embodiment of the present disclosure, a method 300 of operating in EAS to regenerate a DPF starts at step 302. In accordance with method 300, at step 304 a reductant is introduced by reductant doser 117 into the exhaust gas downstream of close coupled SCR unit 112. The mixture of reductant and exhaust gas flows to DOC 96 at step 308. At step 310, within DOC 96, the reductant is oxidized which results in the temperature of the exhaust gas increasing at step 312. The exhaust gas at the elevated temperature within DOC 96 flows to DPF 100 at step 314. Due to the elevated temperature of the exhaust gas, soot within DPF 100 is oxidized and DPF 100 is actively regenerated in step 318. In accordance with embodiments of the present disclosure, at step 320, while such active regeneration and oxidation of soot within DPF 100 is occurring, DEF is dosed from DEF doser 114 into the exhaust gas and the NOx content of the exhaust gas entering close coupled SCR unit 112 is reduced.

In accordance with an embodiment of the present disclosure, an amount of reductant introduced by reductant doser 117, at step 304, is sufficient to elevate the temperature of the exhaust gas to 450° C. via an exothermic oxidation of the reductant in the DOC 96. In other embodiments, an amount of reductant introduced by reductant doser 117, at step 304, is sufficient to elevate the temperature of the exhaust gas to 500° C. or more via an exothermic oxidation of the reductant in DOC 96.

In accordance with an embodiment of the present disclosure, during the active regeneration of DPF 100, close coupled SCR unit 112 reduces the NOx content of the exhaust gas by an amount that is 50% or more, 60% or more, 70% or more, 80% or more, or 90% or more of the overall NOx reduction provided by the EAS. As discussed above, overall NOx reduction by the EAS refers to the difference between NOx content of the exhaust gas entering the close coupled SCR unit and the NOx content of the exhaust gas exiting the downstream SCR unit. Embodiments of the present disclosure are not limited to the close coupled SCR unit 112 reducing the NOx content of the exhaust gas by the above amounts. In accordance with other embodiments of the present disclosure, the close coupled SCR unit 112 reduces the NOx content by an amount different from those set forth above.

Figure 4:
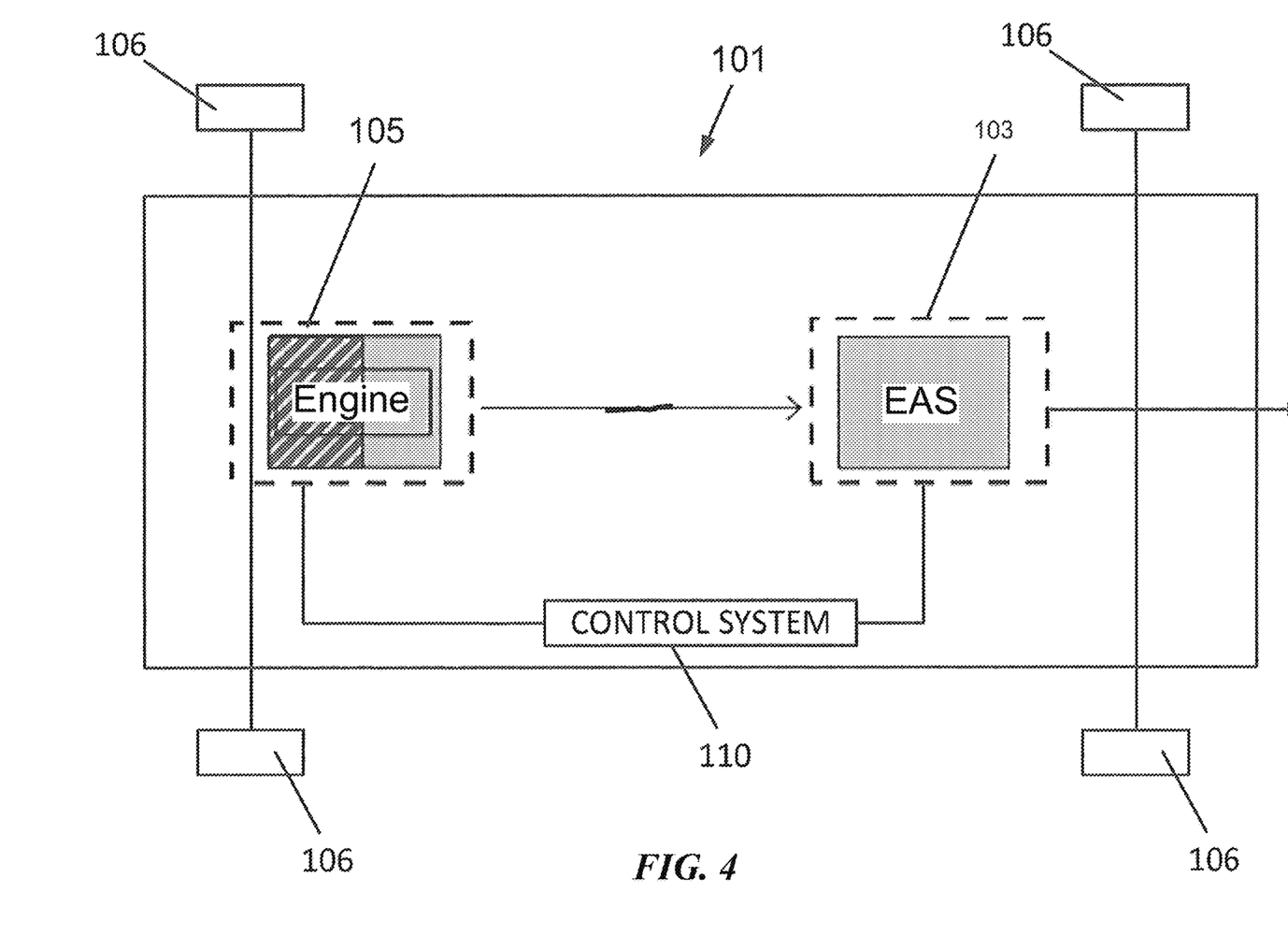
FIG. 4 illustrates a vehicle including an internal combustion engine, an emission aftertreatment system and a control system configured to control components of the engine and emission aftertreatment system according to certain methods in accordance with embodiments described herein.

FIG. 4 illustrates a schematic diagram of a vehicle 101, which may be a heavy-duty vehicle, with an internal combustion engine 105, which may be a diesel engine, an exhaust after-treatment system 103, a set of at least four wheels 106 configured to be powered and driven by the engine 105, and a control system 110, which can perform the methods described herein. When the vehicle 101 is in operation, the control system 110 can be used to control operation of portions of the vehicle 101, including its internal combustion engine 105 and its emission aftertreatment system 103. For example, the control system 110 may be configured to control the engine 105 to idle with any number of its cylinders firing and any number of its cylinders deactivated, to control the engine 105 to increase the load on the engine 105, for example by driving an electric generator (not shown), to direct electrical energy generated by the electrical generator into an exhaust gas stream at a location between the engine 105 and the emission aftertreatment system 103, to increase or decrease the temperature of the gases exhausted from the engine and/or to increase or decrease the volumetric flow of air through the engine. These examples of functions the control system 110 is able to control or initiate are not exhaustive. The control system 110 in accordance with embodiments of the present disclosure may be able to control or initiate other functions of the engine or vehicle. As another example, the control system 110 may be configured to control the exhaust aftertreatment system 103 and components thereof, including a diesel oxidation catalyst (DOC) unit to oxidize unburned fuel and carbon monoxide, a diesel particulate filter (DPF) to control particulate matter (PM), a selective catalytic reduction (SCR) system or unit to reduce oxides of nitrogen (NOX), and an ammonia oxidation catalyst (AMOX) system. For example, in some embodiments, the control system 101 is configured to control an amount of reductant to be oxidized in the DOC during an active regeneration of a DPF and to dose DEF into exhaust gas upstream of a close coupled SCR unit during the active regeneration of the DPF.

In some embodiments, the vehicle 101 includes a plurality of sensors that collect and transmit data regarding operating parameters of the vehicle 101 and/or operating parameters of the EAS to the control system 110, such as continuously. For example, such sensors may collect and transmit data regarding an exhaust gas temperature, volumetric flow rate of exhaust gases, volumetric air flow rate to engine, fuel/air ratio to engine, temperature of air flow to engine, NOx content of the exhaust gas, NOx content of exhaust gas exiting the SCR units, volumetric flow of DEF dosing, temperature of the engine, an operating speed of the internal combustion engine 105 (e.g., in RPM) to the control system 110, load on the engine, temperature of SCR unit and level of exhaust gas recirculation (EGR). Other sensors may collect and transmit data regarding the EAS. For example, such sensors can collect and transmit data regarding an amount of NOx entering an upstream SCR or entering a downstream SCR, amount of NOx out of an upstream SCR or out of a downstream SCR, quantity of DEF dosing and temperature of upstream and/or downstream SCR units.

Figure 5:
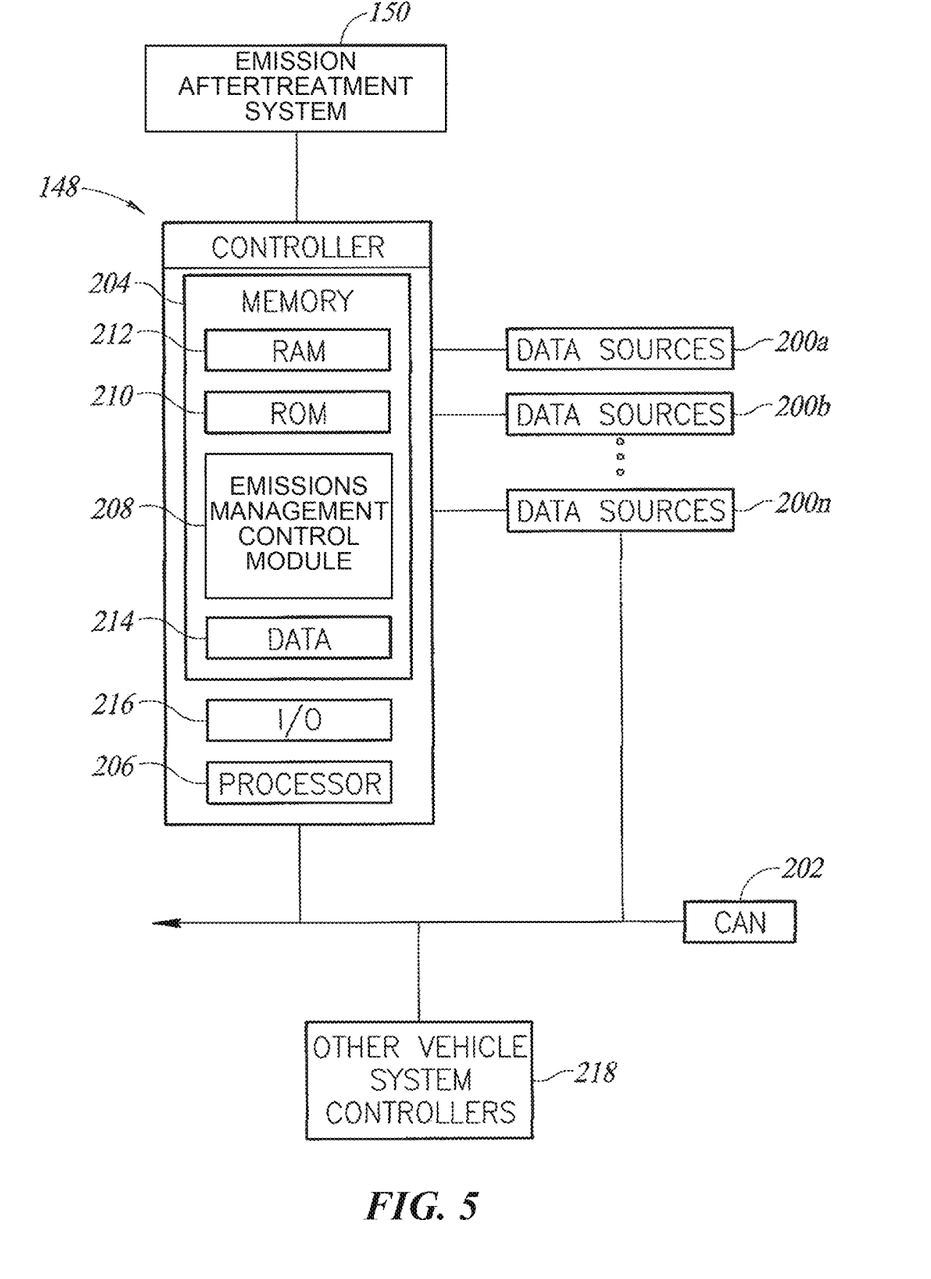
FIG. 5 is a schematic block diagram of an emission management system in accordance with some embodiments disclosed herein.

FIG. 5 shows one non-limiting example of an emissions aftertreatment system controller 148 formed in accordance with aspects of the present disclosure and can be part of the control system 110. The control system may be an emissions management system associated with an EAS system of a vehicle powered by an internal combustion engine or an EAS of an internal combustion engine implemented in a stationary application. The controller 148 is connected in electrical communication with a plurality of data sources 200a-200n (generally, data sources 200). As will be described in more detail below, the data sources 200 may include but are not limited to on-board sensors, e.g., engine sensors and EAS sensors, on-board state estimators, etc. It will be appreciated that the controller 148 can be connected directly (wired or wirelessly) to the plurality of data sources 200 or indirectly via any suitable interface, such as a CAN interface 202. Those skilled in the art and others will recognize that the CAN 202 may be implemented using any number of different communication protocols such as, but not limited to, Society of Automotive Engineers ("SAE") J1587, SAE J1922, SAE J1939, SAE J1708, and combinations thereof. The controller 148 may also communicate with other electronic components of the vehicle 101 via the CAN 202 for collecting data from other electronic components to be utilized by the controller 148, and as such, can also be considered in at least some embodiments as data sources 200. For example, the controller 148 may receive data from one or more other controllers 218, such as an engine controller, a transmission controller, a brake system controller, etc. In operation, as will be described in more detail below, the controller 148 receives signals from the data sources 200, processes such signals and others, and depending on the processed signals, transmits suitable control signals for operating the EAS 150, the engine 105 or other systems or components of the vehicle 101. The controller 148 initiates operation by means of a hard wired input (e.g. ignition key 154) or by receiving a signal from a communication network (e.g. wake-up on CAN). This wake-up message allows to bring the controller 148 in operation, whereas the operator does not need to use the ignition keys or be physically in or near the vehicle 101. The controller 148 may be a standalone controller or may be part of one or more other controllers (e.g., vehicle electronic control unit (VECU)) of the vehicle 101. Generally, the emission aftertreatment system may be implemented in any local or remote controller(s) operative to provide the functionality described herein.

In at least some embodiments, the controller 148 may contain logic rules implemented in a variety of combinations of hardware circuitry components and programmed processors to effect control of the EAS 150 and other systems of the vehicle 101. To that end, as further illustrated in FIG. 5, one suitable embodiment of the controller 148 includes a nontransitory memory 204, a processor 206, and emissions management control module 208 for providing functionality of the controller 148. The memory 204 may include computer readable storage media in read-only memory (ROM) 210 and random-access memory (RAM) 212, for example. The computer-readable storage media may be implemented using any of a number of memory devices such as PROMs (programmable read-only memory), EPROMs (electrically PROM), EEPROMs (electrically erasable PROM), flash memory, or any other electric, magnetic, optical, or combination memory devices capable of storing data, including data 214 (e.g., programmable parameters). The controller 148 also includes one or more input/output devices or components 216 that enable the controller to communicate with one or more local or remote devices via wired or wireless communication. In at least some embodiments, the controller 148 may include additional components including but not limited to a high speed clock, analog to digital (A/D) and digital to analog (D/A) circuitry, other input/output circuitry and devices (I/O), and appropriate signal conditioning and buffer circuitry.

As used herein, the term processor is not limited to integrated circuits referred to in the art as a computer, but broadly refers to one or more of a microcontroller, a microcomputer, a microprocessor, a central processing unit (CPU), a graphics processing unit (GPU), a programmable logic controller, an application specific integrated circuit, other programmable circuits, combinations of the above, among others. In at least one embodiment, the processor 206 executes instructions stored in memory 204, such as engine restart control module 208, to implement the functionality described in the present disclosure.

The emissions management control module 208 may include a set of control algorithms, including program instructions, selectable parameters, and calibrations stored in one of the storage media and executed to provide functions described herein. Information transfer to and from the module 208 may be accomplished by way of a direct connection, a local area network bus, a serial peripheral interface bus, wired or wireless interfaces, etc. The algorithms may be executed during preset loop cycles such that each algorithm is executed at least once each loop cycle. Algorithms stored in the non-volatile memory devices may be executed by the processor 206 to monitor inputs from the sensing devices and other data transmitting devices or polls such devices for data to be used therein. Loop cycles may be executed at regular intervals during ongoing operation of the vehicle 101. Alternatively or additionally, algorithms may be executed in response to the occurrence of one or more events.

The processor 206 communicates with various data sources 200 directly or indirectly via the input/output (I/O) interface 216 and suitable communication links. The interface 216 may be implemented as a one or more integrated interfaces that provide various raw data or signal conditioning, processing, and/or conversion, short-circuit protection, and/or the like. Additionally or alternatively, one or more dedicated hardware or firmware chips may be used to condition and process particular signals before being supplied to the processor 206. In at least some embodiments, the signals transmitted from the interface 216 may be suitable digital or analog signals.

The controller 148 may be a separate controller that implements the EAS management functionality described herein. However, it should be appreciated that the controller 148 may be a controller module, which could be software embedded within an existing on-board controller, such as the engine controller, a general purpose controller, other vehicle system controllers, etc.

As briefly described above, the data sources 200 can include but are not limited to on-board sensors for detecting operation parameters of an EAS, navigation/GPS devices, communications devices, data stores, remote servers, etc. These data sources and others in at least some embodiments may be part of the electrical systems 138, control console 132, etc., described above. The data supplied from these data sources 200 and others may generally or specifically relate to vehicle operating parameters, e.g., engine or EAS operating parameters, operator driving trends and accessories (e.g., loads 220) usage patterns and characteristics, and external parameters, including present vehicle navigation, traffic patterns, weather data, sunrise and sunset data, temperature data, among others.

One or more implementations of the present disclosure are directed to systems and methods for operating an emissions aftertreatment system (EAS) and for regenerating a diesel particulate filter of such EAS. The EAS is connected to an internal combustion engine, for example, a diesel engine of a light-duty or heavy-duty vehicle or a stationary internal combustion engine. The systems and methods utilize a close coupled SCR unit to reduce the NOx content of exhaust gas, particularly during elevated temperature conditions associated with regeneration of a DPF which impede the NOx conversion efficiency of a SCR unit downstream of the DPF under regeneration.

Although exemplary embodiments of the present disclosure are described hereinafter with reference to a heavy duty truck, it will be appreciated that aspects of the present disclosure have wide application, and therefore, may be suitable for use with many other types of vehicles, including but not limited to light and medium duty vehicles, passenger vehicles, motor homes, buses, commercial vehicles, marine vessels, generator sets, etc. In addition, embodiments of the present disclosure have application with internal combustion engines which are not associated with vehicles. For example, embodiments of the present disclosure have application with internal combustion engines that are utilized in stationary applications, for example, power generation. Accordingly, the foregoing descriptions and illustrations herein should be considered illustrative in nature, and thus, not limiting the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating an emissions aftertreatment system (EAS) including a close coupled SCR unit and a downstream SCR unit, the method comprising:

actively regenerating a diesel particulate filter (DPF) unit of the EAS by oxidizing soot in the DPF unit;

flowing diesel exhaust fluid into an exhaust gas from an internal combustion engine between the close coupled SCR unit and the DPF unit; and during the oxidizing soot in the DPF unit:
- flowing diesel exhaust fluid into the exhaust gas upstream of the close coupled SCR unit,
- introducing thermal energy to the exhaust gas downstream of where the diesel exhaust fluid flows into the exhaust gas stream and upstream of the close coupled SCR unit,
- adjusting the temperature of the exhaust gas flowing into the close coupled SCR unit, and
- reducing an overall NOx content of the exhaust gas in the close coupled SCR unit, over 70 percent of the reduction in the overall NOx content of the exhaust gas provided by the close coupled SCR unit.

2. The method of claim 1, wherein the introducing thermal energy to the exhaust gas downstream of where the diesel exhaust fluid flows into the exhaust gas stream and upstream of the close coupled SCR unit includes introducing thermal energy to the exhaust stream utilizing an electric heater.

3. The method of claim 1, further comprising sensing a concentration of a combined amount of NOx and ammonia in the exhaust gas upstream of the closed coupled SCR unit.

4. The method of claim 1, further comprising sensing a concentration of a combined amount of NOx and ammonia in the exhaust gas downstream of the closed coupled SCR unit and upstream of a DOC which is upstream of the DPF.

5. The method of claim 1, wherein the exhaust gas flowing to the DPF unit is at a temperature greater than 450° F.

6. The method of claim 1, wherein the exhaust gas flowing to the DPF unit is at a temperature greater than 500° F.

7. The method of claim 1, further comprising sensing a concentration of a combined amount of NOx and ammonia in the exhaust gas downstream of the downstream SCR unit.

8. An emissions aftertreatment system (EAS) comprising:
- a close coupled selective catalytic reduction (SCR) unit;
- an NOx sensor upstream of the close coupled SCR unit;
- a diesel exhaust fluid doser upstream of the close coupled SCR unit;
- an electric heater between the diesel exhaust fluid doser and the close coupled SCR unit;
- a diesel oxidation catalyst (DOC) unit, diesel particulate filter (DPF) unit and downstream SCR unit downstream of the close coupled SCR unit;
- a diesel exhaust fluid doser between the close coupled SCR unit and the DOC unit; and
- a reductant doser between the close coupled SCR unit and the DOC unit.

9. The emissions aftertreatment system (EAS) of claim 8, wherein the reductant is a hydrocarbon.

10. The emissions aftertreatment system (EAS) of claim 9, wherein the hydrocarbon is a diesel fuel.

11. The emissions aftertreatment system (EAS) of claim 8, further comprising a NOx sensor between the close coupled SCR unit and the DOC unit.

12. The emissions aftertreatment system (EAS) of claim 8, further comprising a NOx sensor downstream of the downstream SCR unit.

13. The emissions aftertreatment system (EAS) of claim 8, further comprising a NOx sensor downstream of the downstream SCR unit.

14. A method of operating an emissions aftertreatment system (EAS) including an upstream SCR unit and a downstream SCR unit, the method comprising:

actively regenerating a diesel particulate filter (DPF) unit of the EAS by oxidizing soot in the DPF unit;

flowing diesel exhaust fluid into an exhaust gas from an internal combustion engine between the upstream SCR unit and the DPF unit; and during the oxidizing soot in the DPF unit:
- flowing diesel exhaust fluid into the exhaust gas upstream of the upstream SCR unit,
- introducing thermal energy to the exhaust gas downstream of where the diesel exhaust fluid flows into the exhaust gas stream and upstream of the upstream SCR unit,
- adjusting the temperature of the exhaust gas flowing into the upstream SCR unit, and
- reducing an overall NOx content of the exhaust gas in the upstream SCR unit, over 70 percent of the reduction in the overall NOx content of the exhaust gas provided by the upstream SCR unit.

15. The method of claim 14, wherein the introducing thermal energy to the exhaust gas downstream of where the diesel exhaust fluid flows into the exhaust gas stream and upstream of the upstream SCR unit includes introducing thermal energy to the exhaust stream utilizing an electric heater.

16. The method of claim 14, further comprising sensing a concentration of a combined amount of NOx and ammonia in the exhaust gas upstream of the upstream SCR unit.

17. The method of claim 14, further comprising sensing a concentration of a combined amount of NOx and ammonia in the exhaust gas downstream of the upstream SCR unit and upstream of the DOC which is upstream of the DPF.

18. The method of claim 14, wherein the exhaust gas flowing to the DPF unit is at a temperature greater than 450° F.

19. The method of claim 14, further comprising sensing a concentration of a combined amount of NOx and ammonia in the exhaust gas downstream of the downstream SCR unit.

* * * * *

UNITED STATES PATENT AND TRADEMARK OFFICE
CERTIFICATE OF CORRECTION

PATENT NO. : 11,473,470 B2
APPLICATION NO. : 17/507560
DATED : October 18, 2022
INVENTOR(S) : Cynthia Chaffin Webb et al.

Page 1 of 1

It is certified that error appears in the above-identified patent and that said Letters Patent is hereby corrected as shown below:

In the Claims

<u>Column 12, Claim 17, Line 46:</u>
"upstream of the DOC which"
Should read:
--upstream of a DOC which--.

Signed and Sealed this
Twenty-first Day of May, 2024

Katherine Kelly Vidal
*Director of the United States Patent and Trademark Office*